US012482944B2

(12) United States Patent
Minamitani

(10) Patent No.: US 12,482,944 B2
(45) Date of Patent: Nov. 25, 2025

(54) ANTENNA MODULE AND COMMUNICATION DEVICE EQUIPPED WITH SAME

(71) Applicant: Murata Manufacturing Co., Ltd., Nagaokakyo (JP)

(72) Inventor: Natsumi Minamitani, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 60 days.

(21) Appl. No.: 18/666,921

(22) Filed: May 17, 2024

(65) Prior Publication Data

US 2024/0304996 A1 Sep. 12, 2024

Related U.S. Application Data

(63) Continuation of application No. PCT/JP2022/046651, filed on Dec. 19, 2022.

(30) Foreign Application Priority Data

Dec. 22, 2021 (JP) ................................ 2021-208176

(51) Int. Cl.

*H01Q 9/04* (2006.01)
*H01Q 1/22* (2006.01)
*H01Q 1/48* (2006.01)

(52) U.S. Cl.

CPC ............ *H01Q 9/0414* (2013.01); *H01Q 1/22* (2013.01); *H01Q 1/48* (2013.01)

(58) Field of Classification Search

CPC .......... H01Q 9/0414; H01Q 1/22; H01Q 1/48; H01Q 5/40; H01Q 1/40

See application file for complete search history.

(56) References Cited

U.S. PATENT DOCUMENTS 11,211,718 B2 * 12/2021 Ueda .................... H01Q 21/245
11,539,122 B2 * 12/2022 Takayama ............ H01Q 1/2283

FOREIGN PATENT DOCUMENTS

JP H01-243605 A 9/1989
JP 2002-118417 A 4/2002
JP 2006-094349 A 4/2006
WO 2022/038868 A1 2/2022

OTHER PUBLICATIONS

International Search Report and Written Opinion mailed on Feb. 28, 2023, received for PCT Application PCT/JP2022/046651, filed on Dec. 19, 2022, 9 pages including English Translation.

* cited by examiner

*Primary Examiner* — Seung H Lee
(74) *Attorney, Agent, or Firm* — XSENSUS LLP

(57) ABSTRACT

An antenna module includes a ground electrode, a dielectric substrate, and a first radiating element and a second radiating element arranged in the dielectric substrate. The second radiating element is arranged at a position upward from the first radiating element. The first radiating element has a non-superposing portion where the second radiating element is not superposed when viewed in plan view from a height direction. The dielectric substrate has an upper surface and a step surface positioned upward from the non-superposing portion of the first radiating element and downward from the second radiating element. The dielectric substrate is covered with a high dielectric layer.

20 Claims, 7 Drawing Sheets

ANTENNA MODULE AND COMMUNICATION DEVICE EQUIPPED WITH SAME

CROSS-REFERENCE TO RELATED APPLICATIONS

This is a continuation application of PCT/JP2022/046651 filed on Dec. 19, 2022, designating the United States of America, which is based on and claims priority to Japanese Patent Application No. JP 2021-208176 filed on Dec. 22, 2021. The entire contents of the above-identified applications, including the specifications, drawings and claims, are incorporated herein by reference in their entirety.

TECHNICAL FIELD

The present disclosure relates to an antenna module and a communication device equipped with the same and, more specifically, to a technology for achieving wide-band antenna characteristics.

BACKGROUND ART

In Japanese Unexamined Patent Application Publication No. 1-243605 (Patent Document 1), a structure is disclosed in which, in an array antenna having a plurality of patch antennas arranged at regular spacing on a surface of a flat-shaped substrate, a plurality of dielectrics are arranged in arrangement areas of the plurality of patch antennas on the surface of the substrate.

CITATION LIST

Patent Document

Patent Document 1: Japanese Unexamined Patent Application Publication No. 1-243605

SUMMARY OF DISCLOSURE

Technical Problem

In recent years, developments of communication devices complying with a plurality of communication standards have been advancing. In these communication devices, it is required to transmit and receive electric waves in different frequency bands each defined for every communication standard and, for this reason, an antenna module having a structure (hereinafter also referred to as "stack structure") in which a plurality of radiating elements supporting frequency bands of two or more types are stacked in the same substrate is present. It is desired that each frequency band has a wide frequency bandwidth.

In general, parameters (permittivity and so forth) suitable for antenna characteristics vary for each frequency band as a target. In the antenna module having the stack structure as described above, even if the dielectrics are arranged on the surface of the substrate as in Japanese Unexamined Patent Application Publication No. 1-243605 (Patent Document 1), the dielectrics are arranged at positions away from the radiating elements arranged inside the substrate. Thus, there may be a case in which wide-band antenna characteristics of each radiating element, in particular, wide-band antenna characteristics of a radiating element arranged inside the substrate, cannot be appropriately achieved.

The present disclosure was made to solve the problem as described above, and has an object of appropriately achieving wide-band antenna characteristics of each radiating element in an antenna module having a stack structure.

Solution to Problem

An antenna module according to the present disclosure includes: a flat-shaped first ground electrode; a dielectric substrate arranged near the first ground electrode; and a flat-shaped first radiating element and a flat-shaped second radiating element arranged substantially in parallel to the first ground electrode in the dielectric substrate and each emitting radio waves. When a direction of normal to the first ground electrode is taken as a height direction, a direction away from the first ground electrode along the height direction is taken as upward, and a direction approaching the first ground electrode along the height direction is taken as downward, the second radiating element is arranged at a position upward from the first radiating element. The first radiating element has a superposing portion where the second radiating element is superposed and a non-superposing portion where the second radiating element is not superposed when viewed in plan view from the height direction. The dielectric substrate has an upper surface positioned upward from the second radiating element, and a first step surface positioned upward from the non-superposing portion of the first radiating element and downward from the second radiating element. A high dielectric layer having permittivity higher than permittivity of the dielectric substrate is arranged in an area peripheral to the upper surface and in an area peripheral to the first step surface.

Advantageous Effects of Disclosure

According to the present disclosure, the dielectric substrate having the first radiating element and the second radiating element stacked therein is formed so as to have the upper surface positioned upward from the second radiating element and the first step surface positioned upward from the non-superposing portion of the first radiating element and downward from the second radiating element. In the area peripheral to the upper surface of the dielectric substrate and the area peripheral to the first step surface, the high dielectric layer having permittivity higher than permittivity of the dielectric substrate is arranged. With this, not only effective permittivity of the second radiating element arranged on the periphery of the upper surface of the dielectric substrate but also effective permittivity of the first radiating element arranged inside the dielectric substrate can be increased. As a result, in the antenna module having the stack structure, wide-band antenna characteristics of each radiating element can be appropriately achieved.

DESCRIPTION OF EMBODIMENTS

Figure 1:
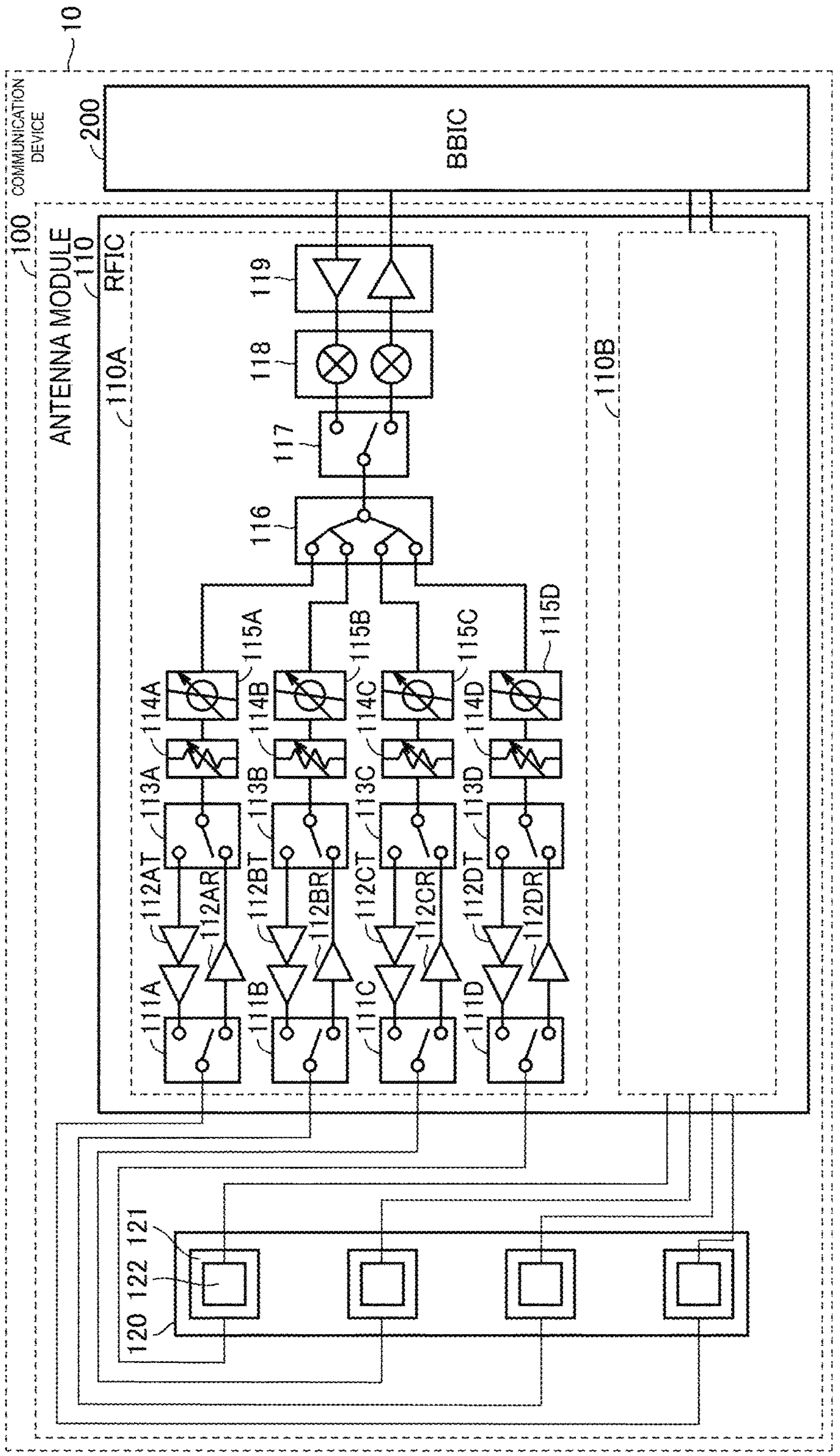
FIG. 1 is one example of a block diagram of a communication device to which an antenna module is applied.

An embodiment of the present disclosure is described in detail below with reference to the drawings. Note that identical or relevant portions are provided with the same reference character and are not repeatedly described.

(Basic Structure of Communication Device)

FIG. 1 is one example of a block diagram of a communication device 10 to which an antenna module 100 according to the present embodiment is applied. The communication device 10 is, for example, a portable terminal such as a cellular phone, smartphone, or tablet; a personal computer having a communication function; or the like. While one example of a frequency band of radio waves for use in the antenna module 100 according to the present embodiment is, for example, a radio wave in a milli-wave band with 28 GHz, 39 GHz, 60 GHz, or the like taken as a center frequency, radio waves in a frequency band other than the above can also be applied.

With reference to FIG. 1, the communication device 10 includes the antenna module 100 and a BBIC 200 configuring a baseband signal processing circuit. The antenna module 100 includes an RFIC 110, which is one example of a feed device, and an antenna device 120. The communication device 10 up-converts a signal transferred from the BBIC 200 to the antenna module 100 to a high frequency signal at the RFIC 110, and emits the signal from the antenna device 120. Also, the communication device 10 transmits a high frequency signal received at the antenna device 120 to the RFIC 110 for down-conversion and processes the signal at the BBIC 200.

The antenna module 100 is an antenna module of a so-called multiband type capable of radiating radio wave in frequency bands of two types different from each other. The antenna device 120 includes a plurality of radiating elements 121 and a plurality of radiating elements 122.

Each of the radiating elements 121 and the radiating elements 122 is a flat-shaped patch antenna having a rectangular shape. The size of the radiating element 122 is smaller than the size of the radiating element 121. That is, the resonant frequency of the radiating element 122 is higher than the resonant frequency of the radiating element 121. Thus, the frequency band of radio waves emitted from the radiating element 122 (hereinafter also referred to as "second frequency band f2") is higher than the frequency band of radio waves emitted from the radiating element 121 (hereinafter also referred to as "first frequency band f1"). For example, the center frequency of the first frequency band f1 and the center frequency of the second frequency band f2 can be set at 28 GHz and 39 GHz, respectively.

The radiating element 121 and the radiating element 122 are arranged as being stacked in a dielectric substrate. A plurality of sets (four sets in the example depicted in FIG. 1) of the radiating element 121 and the radiating element 122 stacked are arranged in a one-dimensional array shape. Note that the arrangement of sets of the radiating element 121 and the radiating element 122 is not limited to be in a one-dimensional array shape but may be in a two-dimensional array shape.

The RFIC 110 includes two feed circuits 110A and 110B corresponding to the radiating element 121 and the radiating element 122, respectively. Note that the structure of the feed circuit 110A corresponding to the radiating element 121 is depicted in FIG. 1 and the structure of the feed circuit 110B having a similar structure and corresponding to the radiating element 122 is omitted. That is, the structure of the feed circuit 110B is similar to the structure of the feed circuit 110A.

The feed circuit 110A includes switches 111A to 111D, 113A to 113D, and 117; power amplifiers 112AT to 112DT; low noise amplifiers 112AR to 112DR; attenuators 114A to 114D; phase shifters 115A to 115D; signal multiplexer/demultiplexer 116; a mixer 118; and an amplifier circuit 119.

To transmit a high frequency signal, the switches 111A to 111D and 113A to 113D are switched to power amplifiers 112AT to 112DT sides, and the switch 117 is connected to a transmission-side amplifier of the amplifier circuit 119. To receive a high frequency signal, the switches 111A to 111D and 113A to 113D are switched to low noise amplifiers 112AR to 112DR sides, and the switch 117 is connected to a reception-side amplifier of the amplifier circuit 119.

A signal transferred from the BBIC 200 is amplified at the amplifier circuit 119 and up-converted at the mixer 118. A transmission signal, which is an up-converted high frequency signal, is demultiplexed into four signals at the signal multiplexer/demultiplexer 116 to pass through four signal paths and be fed to different radiating elements 121. With this, a radio wave of the first frequency band f1 is emitted from each radiating element 121. Here, the degrees of phase shift of the phase shifters 115A to 115D arranged at the signal paths are individually adjusted, thereby allowing the directivity of the antenna device 120 to be adjusted. Also, the attenuators 114A to 114D each adjust the strength of the transmission signal.

Reception signals, which are high frequency signals received at the radiating elements 121, pass through different four signal paths to be multiplexed at the signal multiplexer/demultiplexer 116. The multiplexed reception signal is down-converted at the mixer 118 and amplified at the amplifier circuit 119 to be transferred to the BBIC 200.

The RFIC 110 is formed as, for example, a one-chip integrated circuit component including the above-described circuit structure, or may be formed as an individual integrated circuit component for each feed circuit. Furthermore, a device (switch, power amplifier, low noise amplifier, attenuator, and phase shifter) corresponding to each radiating element may be formed as a one-chip integrated circuit component for each corresponding radiating element.

(Structure of Antenna Module)

Figure 2:
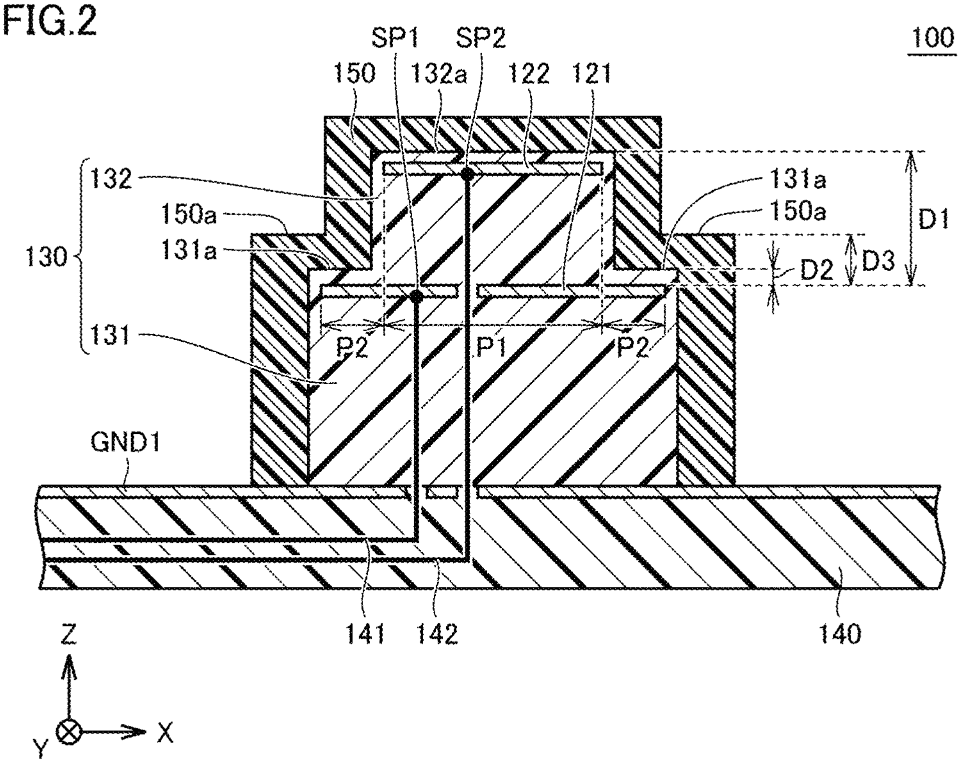
FIG. 2 is a side perspective view (I) of the antenna module.

Details of the structure of the antenna module 100 are described below by using FIG. 2. FIG. 2 is a side perspective view of the antenna module 100.

The antenna module 100 includes, in addition to the above-described radiating elements 121 and 122 and RFIC 110, a dielectric substrate 130, a feed substrate (base substrate) 140, feed wires 141 and 142, a high dielectric layer 150, and a ground electrode GND1.

The feed substrate 140 is a flat-shaped dielectric substrate. The RFIC 110 is mounted on the feed substrate 140. Note that depiction of the RFIC 110 is omitted in FIG. 2.

The ground electrode GND1 has a flat shape, and extends over the entire surface of the feed substrate 140 on a side where the radiating elements 121 and 122 are provided. While an example is depicted in FIG. 2 in which the ground electrode GND1 is arranged on the feed substrate 140, the ground electrode GND1 may be arranged on the dielectric substrate 130.

Note that in the following description, a direction of the normal to the ground electrode GND1 is defined as a height direction or a Z-axis direction. Also, directions perpendicular to the Z-axis direction are defined as an X-axis direction and a Y-axis direction. Also, a direction away from the ground electrode GND1 along the height direction (direction from the ground electrode GND1 toward the radiating elements 121 and 122) may be referred to as upward or a Z-axis positive direction, and a direction approaching the ground electrode GND1 along the height direction (direction from the radiating elements 121 and 122 toward the ground electrode GND1) may be referred to as downward or a Z-axis negative direction.

The dielectric substrate 130 is, for example, low temperature co-fired ceramics (LTCC) multilayer substrate, a multilayer resin substrate formed by laminating a plurality of resin layers configured of resin such as epoxy or polyimide, a multilayer resin substrate formed by laminating a plurality of resin layers configured of liquid crystal polymer (LCP) having lower permittivity, a multilayer resin substrate formed by laminating a plurality of resin layers configured of fluorine-based resin, a multilayer resin substrate formed by laminating a plurality of resin layers configured of a polyethylene terephthalate (PET) material, or a ceramics multilayer substrate other than LTCC. Note that the dielectric substrate 130 does not have to have a multilayer structure and may be a single-layer substrate. The feed substrate 140 is a ceramics substrate similar to the dielectric substrate 130.

To the radiating elements 121 and 122, via the feed wires 141 and 142, respectively, a high frequency signal is supplied from the RFIC 110 not depicted. The feed wire 141 penetrates from the RFIC 110 not depicted through the ground electrode GND1 to be connected to a feeding point SP1 of the radiating element 121. Also, the feed wire 142 penetrates from the RFIC 110 not depicted through the ground electrode GND1 and the radiating element 121 to be connected to a feeding point SP2 of the radiating element 122.

The feeding point SP1 is offset from the center of the radiating element 121 to an X-axis negative direction. The feeding point SP2 is offset from the center of the radiating element 122 to the X-axis negative direction. With this, radio waves with the X-axis direction as a polarizing direction are emitted from the respective radiating elements 121 and 122.

The radiating elements 121 and 122 are stacked at regular spacing to the Z-axis direction inside the dielectric substrate 130. The radiating element 122 is arranged at a position near an upper surface 132*a* of the dielectric substrate 130. The radiating element 121 is arranged between the radiating element 122 and the ground electrode GND1.

The radiating elements 121 and 122 each has a rectangular shape when viewed in plan view from the height direction (Z-axis direction). The rectangular size of the radiating element 121 is larger than the rectangular size of the radiating element 122. The radiating elements 121 and 122 are stacked to the Z-axis direction. When the radiating elements 121 and 122 are viewed in plan view from the height direction, the radiating element 121 has a superposing portion P1 where the radiating element 122 is superposed and a non-superposing portion P2 where the radiating element 122 is not superposed. That is, the non-superposing portion P2 is an outer peripheral portion of the radiating element 121, and the superposing portion P1 is a portion inside the non-superposing portion P2 of the radiating element 121.

The dielectric substrate 130 is formed so as to have a step in accordance with the rectangular size of the radiating elements 121 and 122. Specifically, the dielectric substrate 130 includes a first block 131 and a second block 132 arranged upward from the first block 131. While the first block 131 and the second block 132 are integrally formed in the present embodiment, the first block 131 and the second block 132 may be separately formed.

The first block 131 and the second block 132 are each formed in a substantially rectangular-parallelepiped shape. The radiating element 122 is arranged in a layer near the upper surface 132*a* of the second block 132 of the dielectric substrate 130. Note that the radiating element 122 may be arranged in a mode of being exposed to the upper surface 132*a* of the dielectric substrate 130.

The size of the first block 131 is larger than the size of the second block 132. Thus, a step surface 131*a* is formed at a boundary portion of the first block 131 with respect to the second block 132. The step surface 131*a* is positioned upward from the non-superposing portion P2 of the radiating element 121 and downward from the radiating element 122.

The radiating element 121 is arranged in a layer near a boundary surface of the first block 131 of the dielectric substrate 130 with respect to the second block 132. Note that the radiating element 121 may be arranged in a mode of being exposed to the step surface 131*a* of the first block 131.

The high dielectric layer 150 is configured of a dielectric having permittivity higher than permittivity of the dielectric substrate 130. The high dielectric layer 150 is formed so as to cover the entire surface of the dielectric substrate 130. With this, in an area peripheral to the upper surface 132*a* and an area peripheral to the step surface 131*a* of the dielectric substrate 130, the high dielectric layer 150 having permittivity higher than permittivity of the dielectric substrate 130 is arranged.

The high dielectric layer 150 has a step portion 150*a* positioned near the step surface 131*a* of the dielectric substrate 130. The step portion 150*a* is formed with a surface extending to a direction substantially orthogonal to the step surface 131*a* and a surface extending to a direction along the step surface 131*a* being connected together. The step portion 150*a* of the high dielectric layer 150 is positioned upward from the step surface 131*a* of the dielectric substrate 130. Note that the step portion 150*a* may be any formed with surfaces having different tilt angles with respect to the step surface 131*a* being connected together, and is not necessarily limited to have the shape depicted in FIG. 2.

A relation in dimension among a distance D1 from the radiating element 121 to the upper surface 132*a* of the dielectric substrate 130 in the Z-axis direction, a distance D2 from the radiating element 121 to the step surface 131*a* of the dielectric substrate 130 in the Z-axis direction, and a distance D3 from the radiating element 121 to the step portion 150*a* of the high dielectric layer 150 in the Z-axis direction is $D2<D3<D1$.

(Expansion of Frequency Bandwidth of Antenna Module)

In the flat-shaped patch antenna, in general, assuming a Q value determined by a ratio between radiated power and accumulated power by the radiating element and the ground electrode decreases, the frequency bandwidth tends to expand. For example, when the distance between the radiating element and the ground electrode is increased, the Q value decreases to expand the frequency bandwidth.

In the antenna module 100 according to the present embodiment, the high dielectric layer 150 is arranged in the area peripheral to the upper surface 132*a* and the area peripheral to the step surface 131*a* of the dielectric substrate 130. The permittivity of the high dielectric layer 150 is larger than the permittivity of the dielectric substrate 130. With this, compared with a case in which no high dielectric layer 150 is provided, the first frequency band f1 and the second frequency band f2 of radio waves emitted from the radiating elements 121 and 122, respectively, can be appropriately expanded. This point is described by using FIG. 3.

Figure 3:
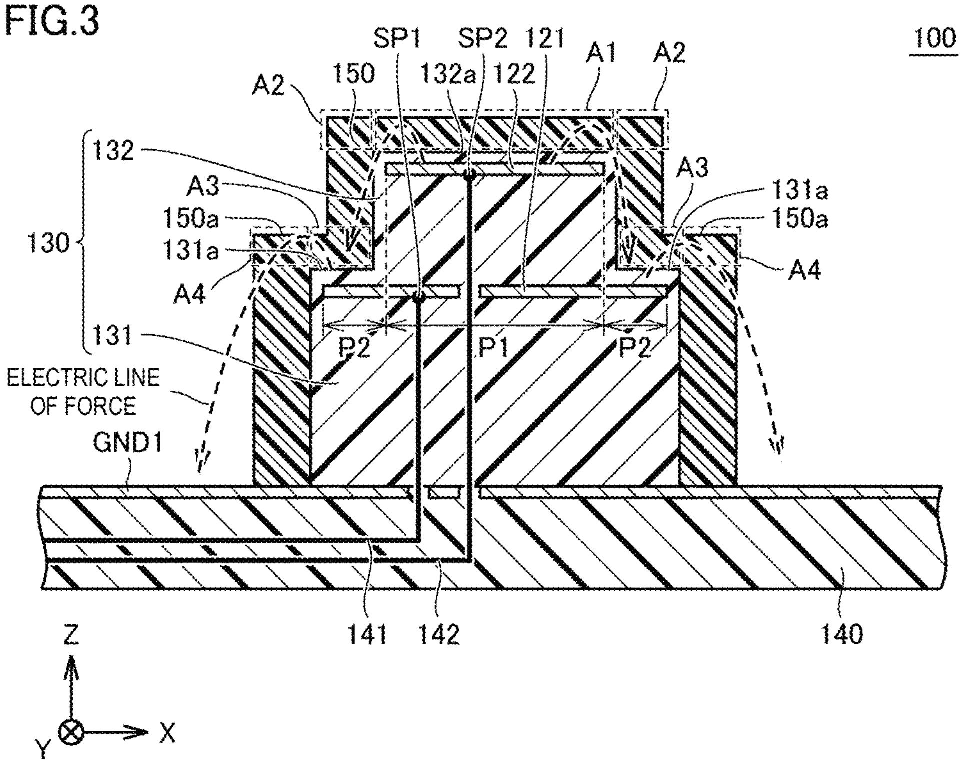
FIG. 3 is a diagram schematically depicting one example of electric lines of force formed between radiating elements and a ground electrode.

FIG. 3 is a diagram schematically depicting one example of electric lines of force formed between the radiating elements 121 and 122 and the ground electrode GND1 when the radiating elements 121 and 122 emit radio waves.

As depicted in FIG. 3, an electric line of force formed between the radiating element 121 and the ground electrode GND1 is outputted from the outer peripheral portion (non-superposing portion P2) of the radiating element 121 toward the Z-axis positive direction and then draws an arc to fall down to the ground electrode GND1. On a path of this electric line of force, the high dielectric layer 150 having permittivity larger than permittivity of the dielectric substrate 130 is arranged. With this, effective permittivity of the path of the electric line of force from the radiating element 121 to the ground electrode GND1 (hereinafter also referred to as "effective permittivity of the radiating element 121") becomes high, compared with a case in which the periphery of the outer peripheral portion (non-superposing portion P2) of the radiating element 121 is surrounded by the dielectric substrate 130 or air. With the effective permittivity of the radiating element 121 becoming high, coupling of surface acoustic waves to the X- and Y-axis directions increases, thereby expanding the first frequency band f1 of radio waves emitted from the radiating element 121.

An electric line of force formed between the radiating element 122 and the ground electrode GND1 is outputted from the outer peripheral portion of the radiating element 122 toward the Z-axis positive direction and then draws an arc to once fall down to the periphery of the outer peripheral portion (non-superposing portion P2) of the radiating element 121 and then further fall down to the ground electrode GND1. Also on a path of this electric line of force, the high dielectric layer 150 having permittivity larger than permittivity of the dielectric substrate 130 is arranged. With this, effective permittivity of the path of the electric line of force from the radiating element 122 to the ground electrode GND1 (hereinafter also referred to as "effective permittivity of the radiating element 122") becomes high, compared with a case in which the high dielectric layer 150 is not arranged on the periphery of the outer peripheral portion of the radiating element 122. With the effective permittivity of the radiating element 122 becoming high, coupling of surface acoustic waves to the X- and Y-axis directions increases, thereby expanding the second frequency band f2 of radio waves emitted from the radiating element 122.

As described above, in the antenna module 100 according to the present embodiment, the dielectric substrate 130 where the radiating elements 121 and 122 are stacked is formed so as to have the step surface 131*a* in accordance with the rectangular size of the radiating elements 121 and 122. With the surface of the dielectric substrate 130 covered with the high dielectric layer 150, the high dielectric layer 150 is arranged in the area peripheral to the upper surface 132*a* and the area peripheral to the step surface 131*a* of the dielectric substrate 130. The permittivity of the high dielectric layer 150 is higher than the permittivity of the dielectric substrate 130. With this, compared with the case in which no high dielectric layer 150 is provided, not only effective permittivity of the radiating element 121 arranged on the periphery of the upper surface 132*a* of the dielectric substrate 130 but also effective permittivity of the radiating element 122 arranged inside the dielectric substrate 130 can be increased. As a result, in the antenna module 100 having the stack structure, wide-band antenna characteristics of each of the radiating elements 121 and 122 can be appropriately achieved.

Furthermore, in the antenna module 100 according to the present embodiment, the step portion 150*a* of the high dielectric layer 150 is present at a position upward from the step surface 131*a* of the dielectric substrate 130. With this, the high dielectric layer 150 having high permittivity is arranged on the path of the electric line of force outputted upward (Z-axis positive direction) from the outer peripheral portion of the radiating element 121 on a lower side. As a result, the effective permittivity of the radiating element 121 can be appropriately increased.

Still further, in the antenna module 100 according to the present embodiment, sets of the radiating element 121 and the radiating element 122 stacked are arranged in an array shape. This allows antenna gain of the antenna module 100 to be improved.

Note that while the high dielectric layer 150 is formed so as to cover the entire surface of the dielectric substrate 130 in the present embodiment, it is preferable that at least an area peripheral to the upper surface 132*a* (an area A1 positioned upward from the upper surface 132*a* and an area A2 adjacent to that area A1 to the X-axis direction) and an area peripheral to the step surface 131*a* (an area A3 positioned upward from the step surface 131*a* and downward from the radiating element 122 and an area A4 adjacent to that area A3 to the X-axis direction) depicted in FIG. 3 are covered with a high dielectric layer having permittivity higher than permittivity of the dielectric substrate 130, and side surfaces of the dielectric substrate 130 do not necessarily have to be covered with the high dielectric layer. Even in this structure, an effect of sufficiently increasing the effective permittivity of each of the radiating elements 121 and 122 can be obtained.

Note that the areas A1 and A2 depicted in FIG. 3 are examples of the area peripheral to the upper surface 132*a*, and it preferable that the area peripheral to the upper surface 132*a* is an area in a distance from the radiating element 122 within a dimension of the radiating element 122 in the X-axis direction. Also, the areas A3 and A4 depicted in FIG. 3 are examples of the area peripheral to the step surface 131*a*, and it is preferable that the area peripheral to the step surface 131*a* is an area in a distance from the radiating element 121 within a dimension of the radiating element 121 in the X-axis direction and also downward from the radiating element 122.

The "ground electrode GND1" of the present embodiment can correspond to "first ground electrode" of the present disclosure. The "dielectric substrate 130", "upper surface 132*a*", and "step surface 131*a*" of the present embodiment can respectively correspond to "dielectric substrate", "upper surface", and "first step surface" of the present disclosure. The "radiating element 121", "superposing portion P1", and "non-superposing portion P2" of the present embodiment can respectively correspond to "first radiating element", "superposing portion", and "non-superposing portion" of the present disclosure. The "radiating element 122" of the present embodiment can correspond to "second radiating element" of the present disclosure. The "high dielectric layer 150" and "step portion 150*a*" of the present embodiment can respectively correspond to "high dielectric layer" and "first step portion" of the present disclosure.

Modification 1

Figure 4:
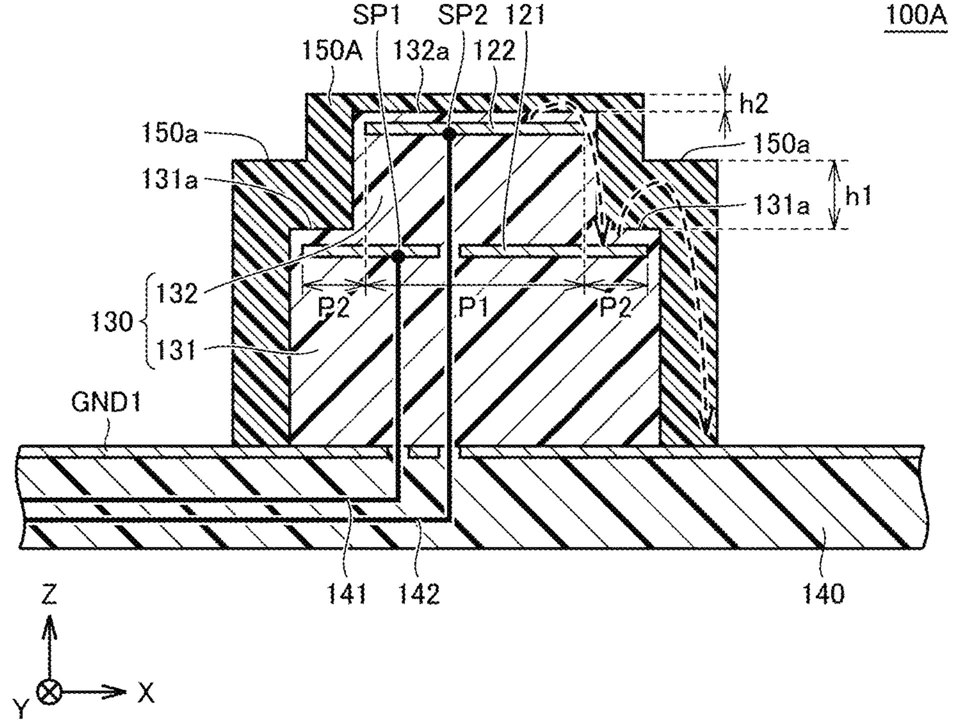
FIG. 4 is a side perspective view (II) of an antenna module.

FIG. 4 is a side perspective view of an antenna module 100A according to Modification 1. In the antenna module 100A, the high dielectric layer 150 of the antenna module 100 according to the above-described embodiment is changed to a high dielectric layer 150A.

The high dielectric layer 150A is different from the above-described high dielectric layer 150 in the dimension in the height direction of a portion positioned upward from the upper surface 132*a* and the dimension in the height direction of a portion positioned upward from the step surface 131*a*.

Specifically, in the high dielectric layer 150 according to the above-described embodiment, the dimension in the height direction of a portion positioned upward from the upper surface 132*a* and the dimension in the height direction of a portion positioned upward from the step surface 131*a* are substantially equal to each other.

By contrast, in the high dielectric layer 150A according to Modification 1, a dimension h2 in the height direction of the portion positioned upward from the upper surface 132*a* is smaller than a dimension h1 in the height direction of the portion positioned upward from the step surface 131*a*.

That is, in the high dielectric layer 150A according to Modification 1, in view of the fact that expansion of the electric line of force from an end portion of the radiating element toward the Z-axis positive direction is thicker as the frequency is lower and is thinner as the frequency is higher, the dimension h1 in the height direction of the portion near the lower-side radiating element 121 emitting radio waves in the lower first frequency band f1 is increased, and the dimension h2 in the height direction of the portion near the upper-side radiating element 122 emitting radio waves in the higher second frequency band f2 is decreased. This allows optimum design in accordance with the frequency of radio waves emitted from each of the radiating elements 121 and 122. Thus, widening the band of the antenna module 100A can be more appropriately achieved.

Modification 2

Figure 5:
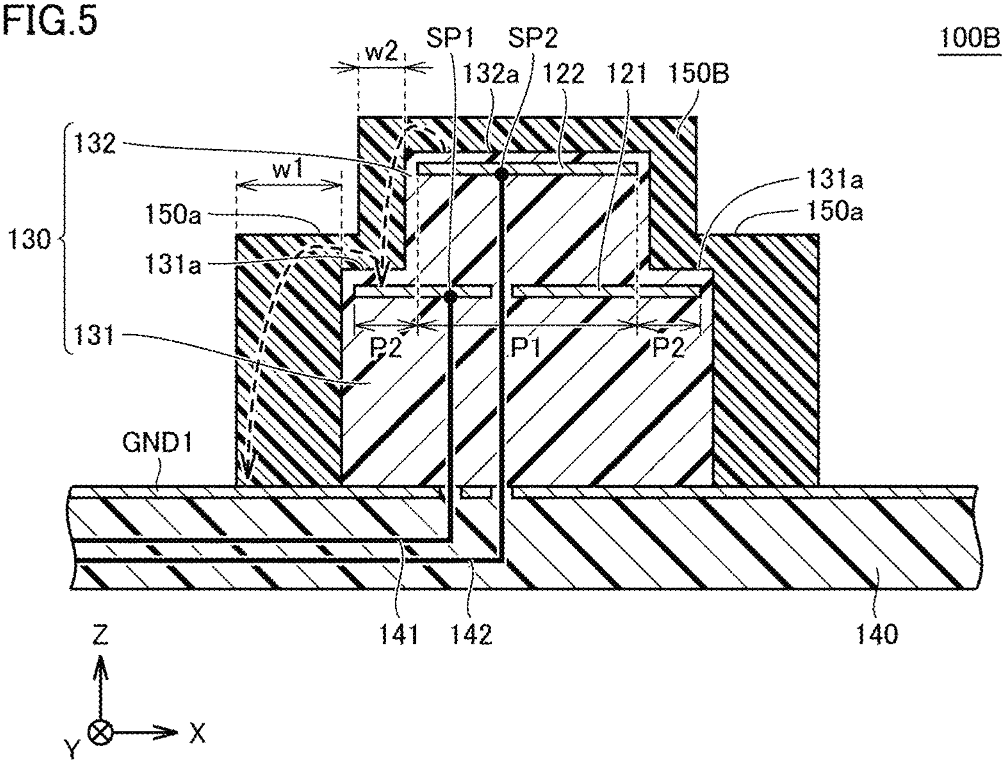
FIG. 5 is a side perspective view (III) of an antenna module.

FIG. 5 is a side perspective view of an antenna module 100B according to Modification 2. In the antenna module 100B, the high dielectric layer 150 of the antenna module 100 according to the above-described embodiment is changed to a high dielectric layer 150B.

When a direction orthogonal to the height direction (X-axis direction and Y-axis direction) is taken as a width direction, the high dielectric layer 150B is different from the above-described high dielectric layer 150 in the dimension in the width direction of a portion positioned in the width direction of the upper surface 132*a* and the dimension in the width direction of a portion positioned in the width direction of the step surface 131*a*.

Specifically, in the above-described high dielectric layer 150, the dimension in the width direction of a portion adjacent to the width direction of the upper surface 132*a* and the dimension in the width direction of a portion adjacent to the width direction of the step surface 131*a* are substantially equal to each other.

By contrast, in the high dielectric layer 150B according to Modification 2, a dimension w2 in the width direction of a portion adjacent to the width direction of the upper surface 132*a* is smaller than a dimension w1 in the width direction of a portion adjacent to the width direction of the step surface 131*a*.

That is, in the high dielectric layer 150B according to Modification 2, in view of the fact that expansion of the electric line of force from an end portion of the radiating element toward the width direction is larger as the frequency is lower and is smaller as the frequency is higher, the dimension w1 in the width direction of the portion near the lower-side radiating element 121 emitting radio waves in the lower first frequency band f1 is increased, and the dimension w2 in the width direction of the portion near the upper-side radiating element 122 emitting radio waves in the higher second frequency band f2 is decreased. This allows optimum design in accordance with the frequency of radio waves emitted from each of the radiating elements 121 and 122. Thus, widening the band of the antenna module 100B can be more appropriately achieved.

Modification 3

Figure 6:
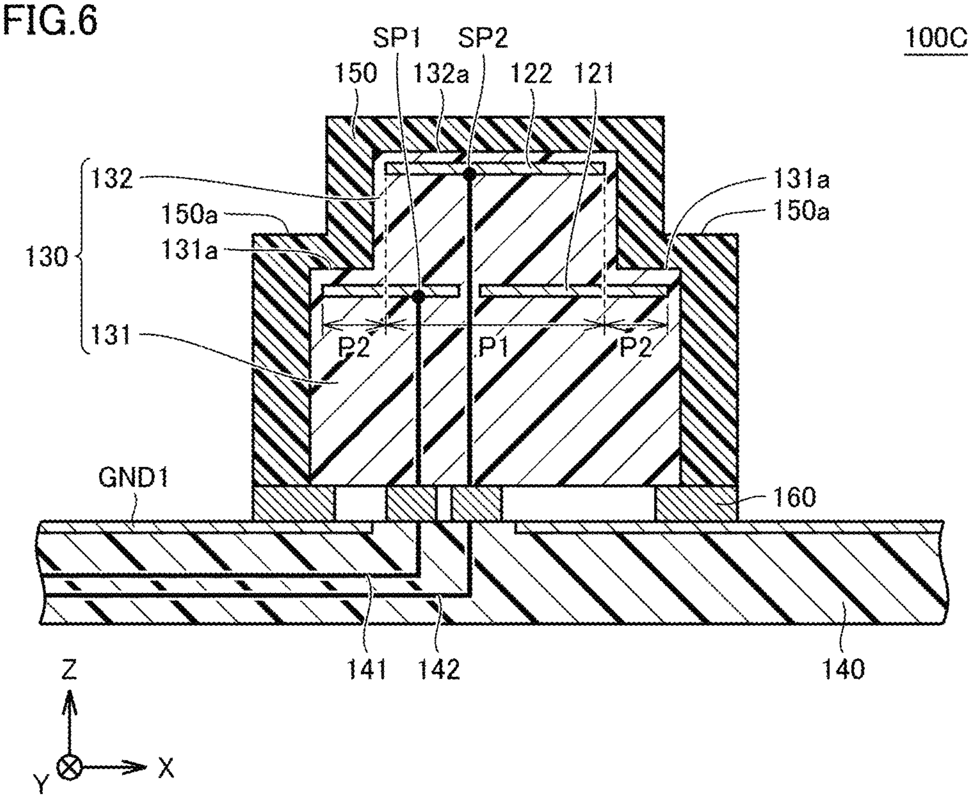
FIG. 6 is a side perspective view (IV) of an antenna module.

FIG. 6 is a side perspective view of an antenna module 100C according to Modification 3. In the antenna module 100C, the dielectric substrate 130 and the feed substrate 140 of the antenna module 100 according to the above-described embodiment are arranged as separated away from each other to the Z-axis direction, and the dielectric substrate 130 and the feed substrate 140 are connected together with solder bump 160. The other structure of the antenna module 100C is identical to that of the antenna module 100 according to the above-described embodiment.

In the antenna module 100C according to Modification 3, the dielectric substrate 130 and the feed substrate 140 are connected together with the solder bump 160. Thus, adhesive strength and electric connectivity between the dielectric substrate 130 and the feed substrate 140 can be improved.

Furthermore, in the antenna module 100C according to Modification 3, the ground electrode GND1 in which an electric line of force is formed between the radiating elements 121 and 122 are arranged on the feed substrate 140 at a distance from the radiating elements 121 and 122 farther away from the dielectric substrate 130, and the solder bump 160 is interposed between the dielectric substrate 130 and the feed substrate 140. This allows the distance between the radiating elements 121 and 122 and the ground electrode GND1 can be made long. Thus, widening the band of the antenna module 100C can be more appropriately achieved.

Modification 4

Figure 7:
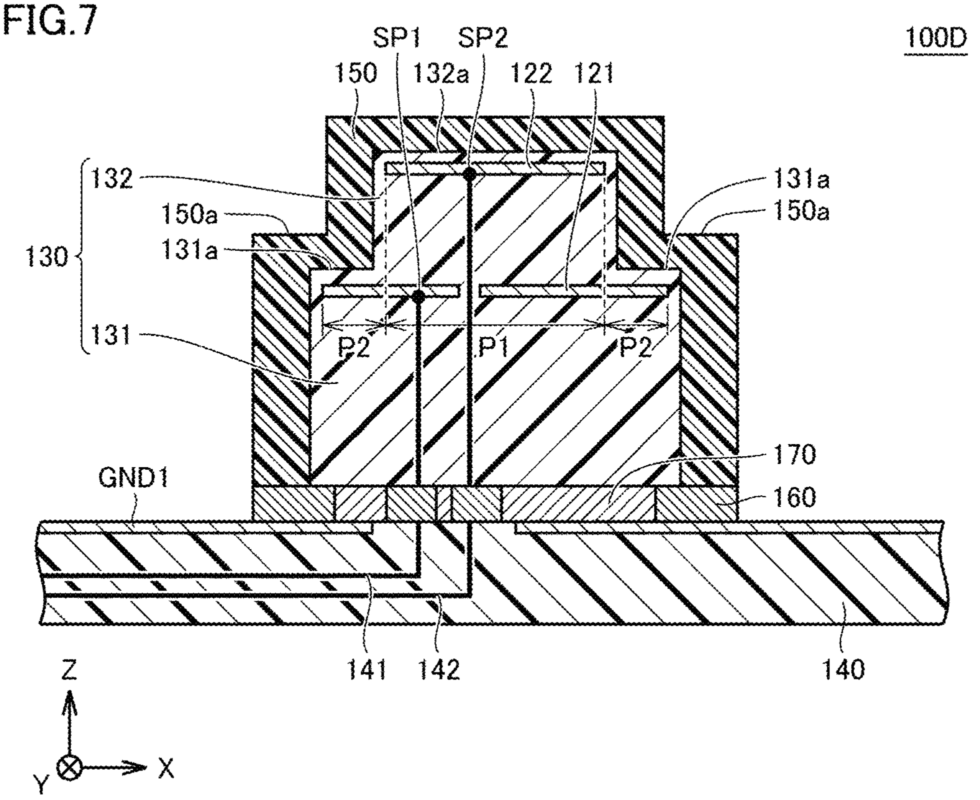
FIG. 7 is a side perspective view (V) of an antenna module.

FIG. 7 is a side perspective view of an antenna module 100D according to Modification 4. The antenna module 100D is one in which a gap between the dielectric substrate 130 and the feed substrate 140 in the antenna module 100C according to the above-described Modification 3 is filled with underfill (liquid curable resin) 170. The other structure of the antenna module 100D is identical to that of the antenna module 100C according to the above-described Modification 3.

In the antenna module 100D according to Modification 4, the dielectric substrate 130 and the feed substrate 140 are connected together with not only the solder bump 160 but also the underfill 170. Thus, connection reliability between the dielectric substrate 130 and the feed substrate 140 can be more improved.

Modification 5

Figure 8:
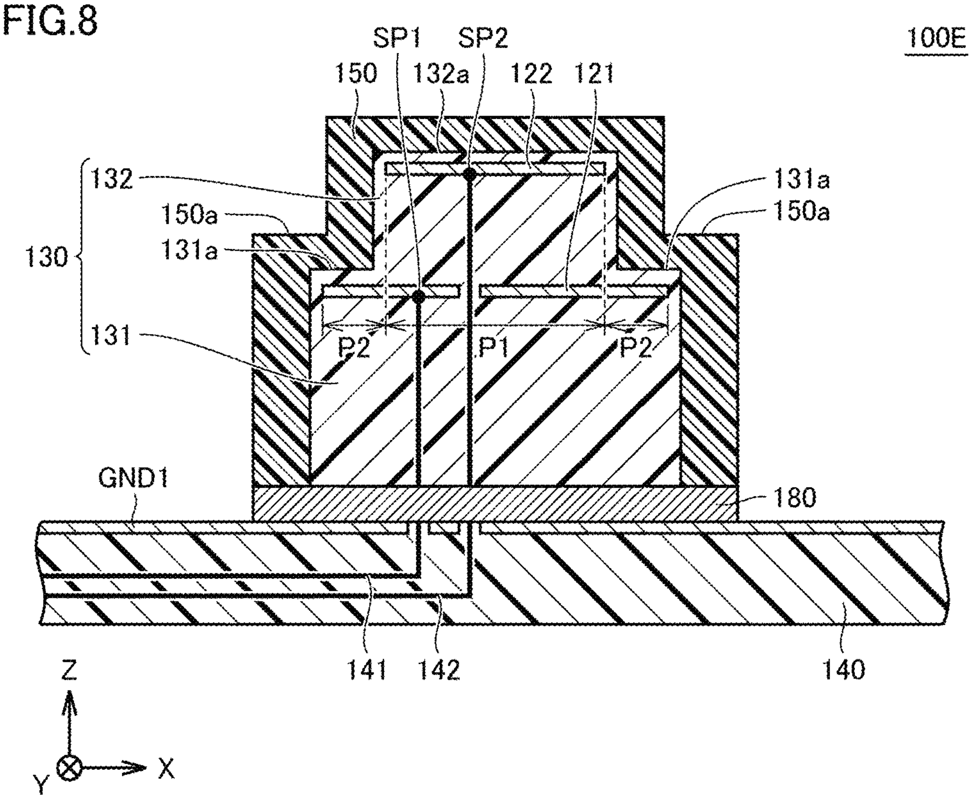
FIG. 8 is a side perspective view (VI) of an antenna module.

FIG. 8 is a side perspective view of an antenna module 100E according to Modification 5. In the antenna module 100E, the dielectric substrate 130 and the feed substrate 140 of the antenna module 100 according to the above-described embodiment are arranged as separated away from each other to the Z-axis direction, and the dielectric substrate 130 and the feed substrate 140 are connected together with an anisotropic conductive sheet 180. The other structure of the antenna module 100E is identical to that of the antenna module 100 according to the above-described embodiment.

In the antenna module 100E according to Modification 5, the dielectric substrate 130 and the feed substrate 140 are connected together with the anisotropic conductive sheet 180. The anisotropic conductive sheet 180 is a conductive sheet made by forming a mixture of thermosetting resin mixed with fine metal particles into a film shape. The anisotropic conductive sheet 180 can easily form paths of the feed wires 141 and 142 by thermocompression bonding. Thus, while the dielectric substrate 130 and the feed substrate 140 are easily connected together, electrical connectivity can be improved.

Modification 6

While the number of stacks (number of stack stages) of radiating elements is two in the above-described embodiment, the number of stacks of radiating elements may be three or greater.

Figure 9:
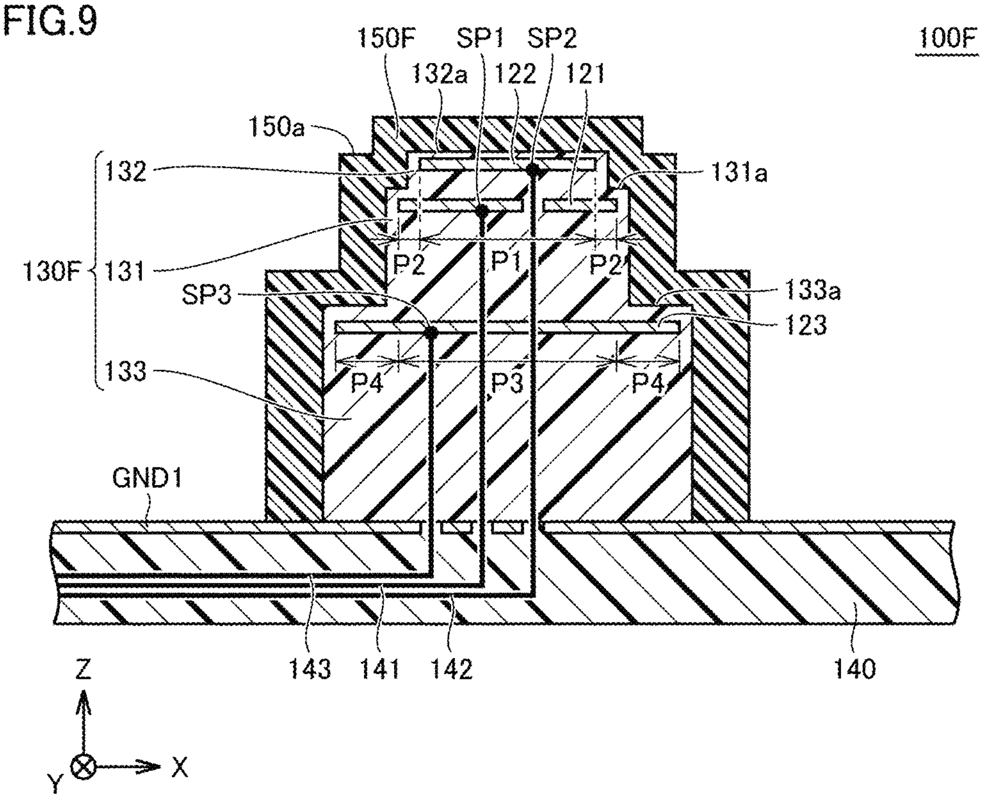
FIG. 9 is a side perspective view (VII) of an antenna module.

FIG. 9 is a side perspective view of an antenna module 100F according to Modification 6. In the antenna module 100F, the number of stacks of the antenna module 100 according to the above-described embodiment is changed from two to three.

Specifically, the antenna module 100F is one in which the dielectric substrate 130 and the high dielectric layer 150 of the antenna module 100 according to the above-described embodiment are changed to a dielectric substrate 130F and a high dielectric layer 150F and, furthermore, a radiating element 123 and a feed wire 143 are added. The dielectric substrate 130F is one in which a third block 133 is added to the above-described dielectric substrate 130.

The radiating element 123 has a rectangular shape when viewed in plan view from the height direction. The rectangular size of the radiating element 123 is larger than the rectangular size of the radiating element 121. The radiating element 123 is arranged at a position downward from the radiating element 121 in the dielectric substrate 130F. The radiating element 123 has a superposing portion P3 where the radiating element 122 is superposed and a non-superposing portion P4 where the radiating element 122 is not superposed when viewed in plan view from the height direction.

The dielectric substrate 130F is formed so as to have a step in accordance with the rectangular size of the radiating element 123. Specifically, the dielectric substrate 130 includes, in addition to the first block 131 and the second block 132, the third block 133 arranged downward from the first block 131.

The size of the third block 133 is larger than the size of the first block 131. Thus, a step surface 133*a* is formed at a boundary portion of the third block 133 with respect to the first block 131. The step surface 133*a* is positioned upward from the non-superposing portion P4 of the radiating element 123 and downward from the radiating element 121.

The high dielectric layer 150F is configured of a dielectric having permittivity higher than permittivity of the dielectric substrate 130F. The high dielectric layer 150F is formed so as to cover the entire surface of the dielectric substrate 130F. With this, the high dielectric layer 150F having permittivity higher than permittivity of the dielectric substrate 130F is arranged in an area peripheral to the upper surface 132*a*, an area peripheral to the step surface 131*a*, and an area peripheral to the step surface 133*a* of the dielectric substrate 130F.

As described above, the number of stacks of radiating elements may be three. The "radiating element 123" of Modification 6 can correspond to "third radiating element" of the present disclosure. The "step surface 133*a*" of Modification 6 can correspond to "second step surface" of the present disclosure.

Modification 7

While one type of high dielectric layer 150 is provided in the antenna module 100 according to the above-described embodiment, different two types of high dielectric layers may be provided.

Figure 10:
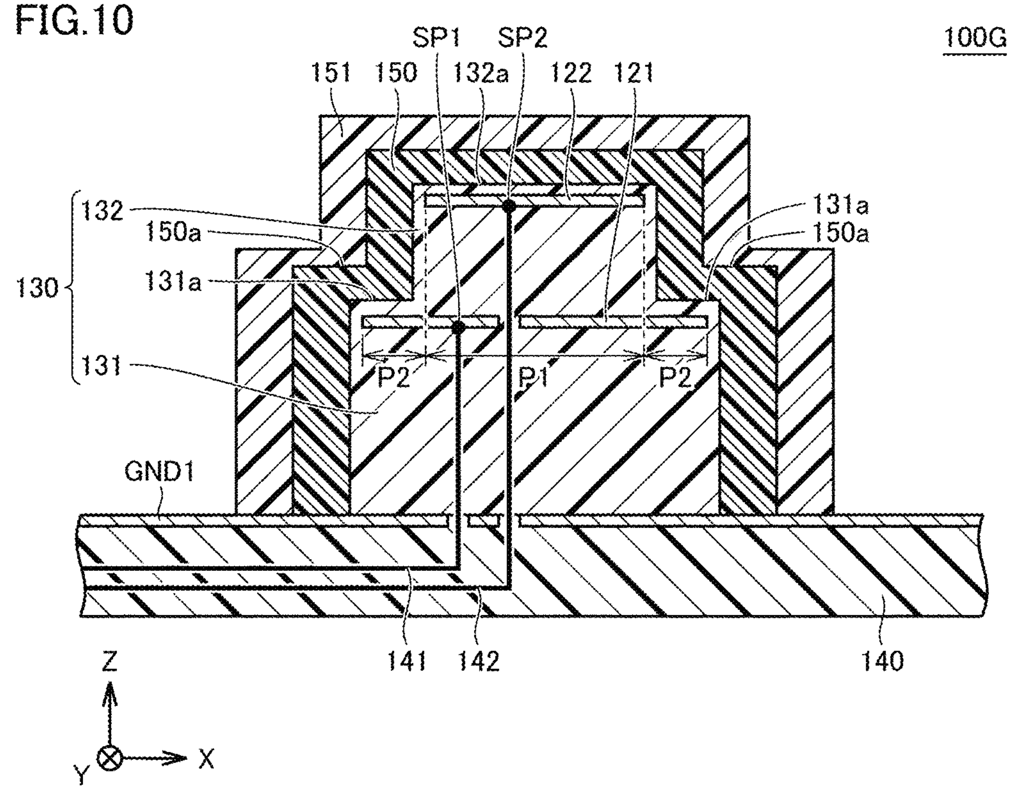
FIG. 10 is a side perspective view (VIII) of an antenna module.

FIG. 10 is a side perspective view of an antenna module 100G according to Modification 7. The antenna module 100G is one in which a high dielectric layer 151 is further added to an outer side portion of the high dielectric layer 150 of the antenna module 100 according to the above-described embodiment. The high dielectric layer 151 is formed so as to cover the surface of the high dielectric layer 150.

In this manner, with the dielectric substrate 130 covered with the high dielectric layers 150 and 151 of two types, design flexibility of effective permittivity is improved. Thus, the antenna characteristics of the antenna module 100G (such as bandwidth, antenna gain, and beam pattern) can be further improved.

The "high dielectric layer 150" and the "high dielectric layer 151" of Modification 7 can respectively correspond to "first high dielectric layer" and "second high dielectric layer" of the present disclosure.

Figure 11:
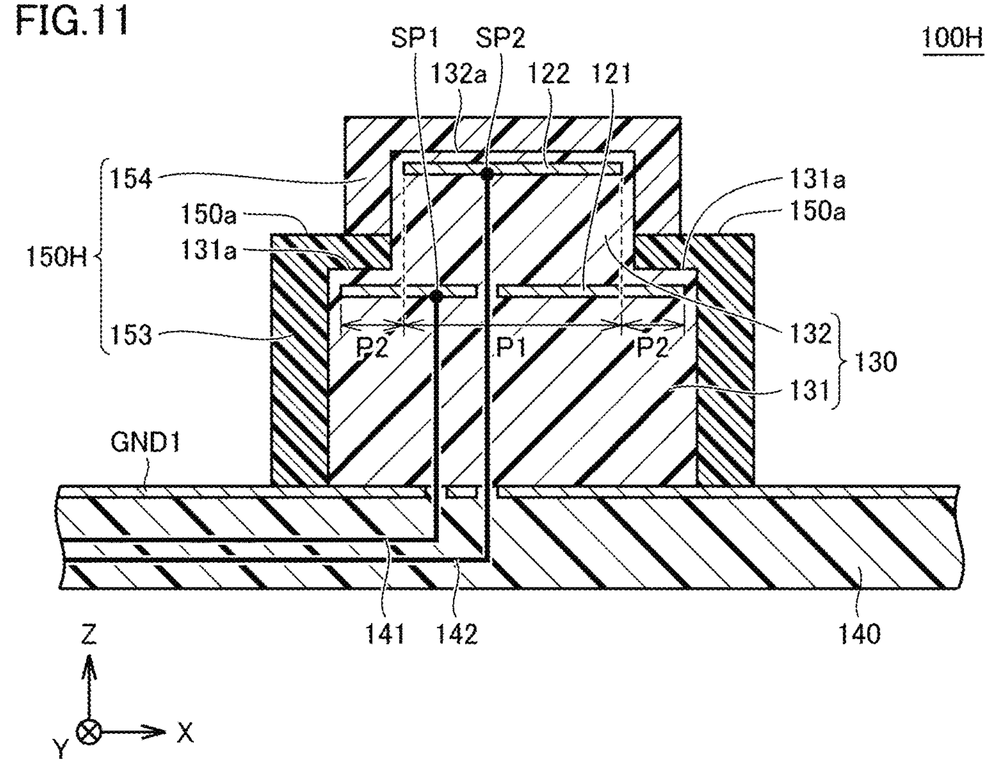
FIG. 11 is a side perspective view (IX) of an antenna module.

FIG. 11 is a side perspective view of an antenna module 100H according to another aspect of Modification 7. In the antenna module 100H, the high dielectric layer 150 of the antenna module 100 according to the above-described embodiment is changed to a high dielectric layer 150H.

The high dielectric layer 150H includes a high dielectric layer 153 covering the first block 131 of the dielectric substrate 130 and a high dielectric layer 154 covering the second block 132 of the dielectric substrate 130.

In this manner, with the surfaces of the first block 131 and the second block 132 of the dielectric substrate 130 covered with the high dielectric layers 153 and 154 of two different types, respectively, design flexibility of effective permittivity is improved. Thus, the antenna characteristics of the antenna module 100H (such as bandwidth, antenna gain, and beam pattern) can be further improved.

The "high dielectric layer 153" and "high dielectric layer 154" of Modification 7 can respectively correspond to "first high dielectric layer" and "second high dielectric layer" of the present disclosure.

Modification 8

Figure 12:
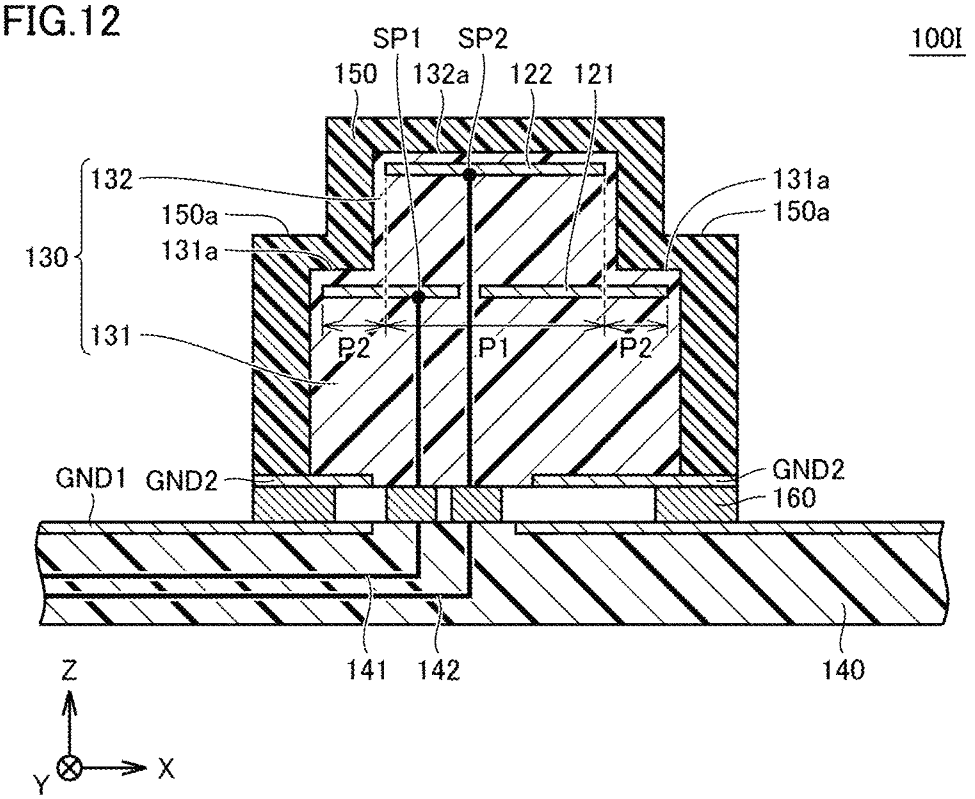
FIG. 12 is a side perspective view (X) of an antenna module.

FIG. 12 is a side perspective view of an antenna module 100I according to Modification 8. The antenna module 100I is one in which a ground electrode GND2 is added to the antenna module 100C according to the above-described Modification 3. The other structure of the antenna module 100I is identical to that of the antenna module 100C according to the above-described Modification 3.

The ground electrode GND1 is arranged on an upper surface of the feed substrate 140 different from the dielectric substrate 130. By contrast, the ground electrode GND2 is flatly arranged on a lower surface of the dielectric substrate 130, and is connected via the solder bump 160 to the ground electrode GND1.

In the antenna module 100I according to Modification 8, the flat-shaped ground electrode GND2 is arranged at a position closer to the radiating elements 121 and 122 than the solder bump 160. Thus, the distance between the radiating elements 121 and 122 and the ground can be stabilized. That is, assuming the ground electrode GND2 is not provided, the distance between the radiating elements 121 and 122 and the solder bump 160 is the distance between the radiating elements 121 and 122 and the ground, and there may be a case in which the surface of the solder bump 160 is not flattened because of being tilted or having asperities and the distance between the radiating elements 121 and 122 and the solder bump 160 is assumed to be unstable. By contrast, assuming the ground electrode GND2 is provided, the distance between the radiating elements 121 and 122 and the ground electrode GND2 is the distance between the radiating elements 121 and 122 and the ground. Thus, the distance between the radiating elements 121 and 122 and the ground can be stabilized.

The "ground electrode GND2" of Modification 8 can correspond to "second ground electrode" of the present disclosure.

Modification 9

While the high dielectric layer 150 according to the above-described embodiment has the step portion 150*a* near the step surface 131*a* of the dielectric substrate 130, the high dielectric layer 150 is not necessarily limited to have the step portion 150*a*.

Figure 13:
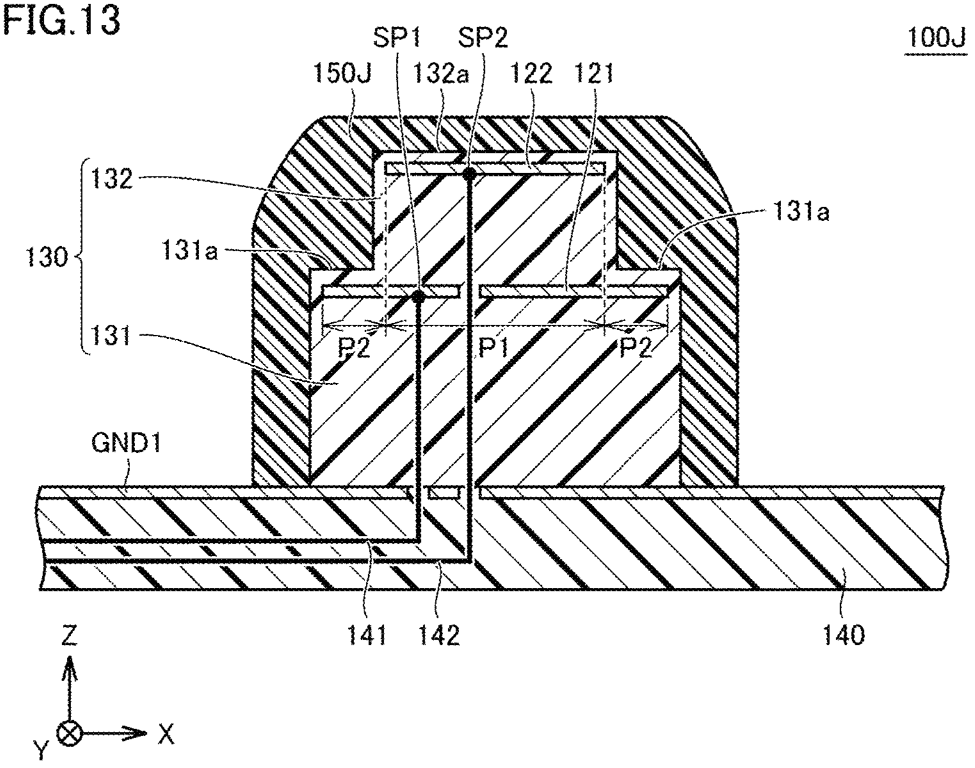
FIG. 13 is a side perspective view (XI) of an antenna module.

FIG. 13 is a side perspective view of an antenna module 100J according to Modification 9. In the antenna module 100J, the high dielectric layer 150 of the antenna module 100 according to the above-described embodiment is changed to a high dielectric layer 150J. The high dielectric layer 150J is one in which the above-described high dielectric layer 150 has the step portion 150*a* eliminated therefrom and is tilted. The antenna module 100J like this may be used.

Modification 10

In the above-described embodiment, the radiating elements 121 and 122 and the ground electrode GND1 are arranged so as to extend to a direction orthogonal to the laminating direction of the multilayer substrate (dielectric substrate 130) (a direction along the layer).

However, the radiating elements 121 and 122 and the ground electrode GND1 may be arranged on the periphery of a side surface of the multilayer substrate and formed so as to extend to a direction along the laminating direction of the multilayer substrate. In this structure, the radiating elements 121 and 122 and the ground electrode GND1 may be configured by combining many vias and many wires.

The embodiment disclosed herein should be considered as an example and not restrictive in all aspects. The scope of the present disclosure is indicated not by the description of the embodiment above but by the scope of the claims and is intended to include meanings equivalent to the scope of claims and all changes in the scope.

REFERENCE SIGNS LIST

10 communication device
100 to 100J antenna module
110A, 110B feed circuit
111A to 111D, 113A to 113D, 117 switch
112AR to 112DR low noise amplifier
112AT to 112DT power amplifier
114A to 114D attenuator
115A to 115D phase shifter
116 demultiplexer
118 mixer
119 amplifier circuit
120 antenna device
121, 122, 123 radiating element
130, 130F dielectric substrate
131 first block
131*a*, 133*a* step surface
132 second block
132*a* upper surface
133 third block
140 feed substrate
141, 142, 143 feed wire
150, 150A, 150B, 150F, 150H, 150J, 151, 153, 154 high dielectric layer
150*a* step portion
160 solder bump
170 underfill
180 anisotropic conductive sheet
GND1, GND2 ground electrode
P1, P3 superposing portion
P2, P4 non-superposing portion

The invention claimed is:

1. An antenna module comprising:

a first ground electrode;

a dielectric substrate arranged near the first ground electrode; and a first radiating element and a second radiating element arranged substantially in parallel to the first ground electrode in the dielectric substrate and each emitting radio waves, wherein when a direction of normal to the first ground electrode is taken as a height direction, a direction away from the first ground electrode along the height direction is taken as upward, and a direction approaching the first ground electrode along the height direction is taken as downward, the second radiating element is arranged at a position upward from the first radiating element, the first radiating element has a superposing portion where the second radiating element is superposed and a non-superposing portion where the second radiating element is not superposed when viewed in plan view from the height direction, the dielectric substrate has
an upper surface positioned upward from the second radiating element, and
a first step surface positioned upward from the non-superposing portion of the first radiating element and downward from the second radiating element, and
a high dielectric layer having permittivity higher than permittivity of the dielectric substrate is arranged in an area peripheral to the upper surface and in an area peripheral to the first step surface.

2. The antenna module according to claim 1, wherein
the high dielectric layer is formed so as to cover a surface of the dielectric substrate.

3. The antenna module according to claim 2, wherein
the high dielectric layer has a step portion positioned near the first step surface and formed with surfaces having different tilt angles with respect to the first step surface being connected together, and
the step portion is positioned upward from the first step surface.

4. The antenna module according to claim 3, wherein
the second radiating element can emit radio waves in a frequency band higher than a frequency band of the first radiating element, and
a dimension in the height direction of a portion of the high dielectric layer positioned upward from the upper surface is smaller than a dimension in the height direction of a portion of the high dielectric layer positioned upward from the first step surface.

5. The antenna module according to claim 3, wherein
the second radiating element can emit radio waves in a frequency band higher than a frequency band of the first radiating element, and
when a direction orthogonal to the height direction is taken as a width direction, a dimension in the width direction of a portion of the high dielectric layer positioned in the width direction of the upper surface is smaller than a dimension in the width direction of a portion of the high dielectric layer positioned in the width direction of the first step surface.

6. The antenna module according to claim 5, wherein
the first ground electrode is arranged on a feed substrate different from the dielectric substrate, and
the dielectric substrate is arranged at a position away from the feed substrate and connected to the feed substrate with solder.

7. The antenna module according to claim 6, wherein
liquid curable resin is filled between the dielectric substrate and the feed substrate.

8. The antenna module according to claim 5, wherein
the first ground electrode is arranged on a feed substrate different from the dielectric substrate, and
the dielectric substrate is connected to the feed substrate with an anisotropic conductive sheet.

9. The antenna module according to claim 8, further comprising
a third radiating element arranged at a position downward from the first radiating element in the dielectric substrate, wherein
the third radiating element has a superposing portion where the first radiating element is superposed and a non-superposing portion where the first radiating element is not superposed when viewed in plan view from the height direction,
the dielectric substrate has a second step surface positioned upward from the non-superposing portion of the third radiating element and downward from the first radiating element, and
the high dielectric layer is arranged in an area upward from the upper surface and an area upward from the first step surface and, in addition, an area upward from the second step surface.

10. The antenna module according to claim 9, wherein
the high dielectric layer includes
a first high dielectric layer, and
a second high dielectric layer having permittivity different from permittivity of the first high dielectric layer.

11. The antenna module according to claim 10, wherein
the first high dielectric layer is formed so as to cover a surface of the dielectric substrate, and
the second high dielectric layer is formed so as to cover a surface of the first high dielectric layer.

12. The antenna module according to claim 10, wherein
the first high dielectric layer is formed in an area near the upper surface of the dielectric substrate, and
the second high dielectric layer is formed in an area near the first step surface of the dielectric substrate.

13. The antenna module according to claim 5, wherein
the first ground electrode is arranged on a base substrate different from the dielectric substrate, and
a second ground electrode connected to the first ground electrode is arranged on a downward portion of the dielectric substrate.

14. The antenna module according to claim 2, wherein
the second radiating element can emit radio waves in a frequency band higher than a frequency band of the first radiating element, and
when a direction orthogonal to the height direction is taken as a width direction, a dimension in the width direction of a portion of the high dielectric layer positioned in the width direction of the upper surface is smaller than a dimension in the width direction of a portion of the high dielectric layer positioned in the width direction of the first step surface.

15. The antenna module according to claim 14, wherein
the first ground electrode is arranged on a feed substrate different from the dielectric substrate, and
the dielectric substrate is arranged at a position away from the feed substrate and connected to the feed substrate with solder.

16. The antenna module according to claim 15, wherein
liquid curable resin is filled between the dielectric substrate and the feed substrate.

17. The antenna module according to claim 14, wherein
the first ground electrode is arranged on a feed substrate different from the dielectric substrate, and
the dielectric substrate is connected to the feed substrate with an anisotropic conductive sheet.

18. The antenna module according to claim 17, further comprising
a third radiating element arranged at a position downward from the first radiating element in the dielectric substrate, wherein
the third radiating element has a superposing portion where the first radiating element is superposed and a non-superposing portion where the first radiating element is not superposed when viewed in plan view from the height direction, the dielectric substrate has a second step surface positioned upward from the non-superposing portion of the third radiating element and downward from the first radiating element, and the high dielectric layer is arranged in an area upward from the upper surface and an area upward from the first step surface and, in addition, an area upward from the second step surface.

19. The antenna module according to claim 18, wherein the high dielectric layer includes a first high dielectric layer, and a second high dielectric layer having permittivity different from permittivity of the first high dielectric layer.

20. A communication device equipped with the antenna module according to claim 13.

* * * * *